United States Patent [19]

Iwasa et al.

[11] Patent Number: 5,690,768
[45] Date of Patent: Nov. 25, 1997

[54] MANUFACTURING PROCESS OF RUBBER LAYERED STRUCTURE

[75] Inventors: Tadanobu Iwasa; Takemasa Yasukawa, both of Inazawa, Japan

[73] Assignee: Toyoda Gosei Co., Ltd., Aichi-ken, Japan

[21] Appl. No.: 545,932

[22] Filed: Oct. 20, 1995

Related U.S. Application Data

[62] Division of Ser. No. 227,988, Apr. 15, 1994, Pat. No. 5,489,461, which is a continuation of Ser. No. 126,740, Sep. 27, 1993, abandoned, which is a continuation of Ser. No. 793,730, Nov. 21, 1991, abandoned.

[30] Foreign Application Priority Data

Nov. 22, 1990 [JP] Japan .................... 2-320192
Nov. 22, 1990 [JP] Japan .................... 2-320193

[51] Int. Cl.⁶ .................... B32B 31/06; B32B 31/08; B32B 31/20
[52] U.S. Cl. ............... 156/108; 156/244.11; 156/244.23; 156/308.2; 156/309.9; 156/324
[58] Field of Search ....................... 156/108, 244.11, 156/308.2, 309.9, 324, 334, 244.23

[56] References Cited

U.S. PATENT DOCUMENTS

| | | |
|---|---|---|
| 4,082,877 | 4/1978 | Shadle . |
| 4,349,592 | 9/1982 | Nussbaum . |
| 4,442,167 | 4/1984 | Iwasa et al. . |
| 4,513,044 | 4/1985 | Shigeki et al. . |
| 4,572,871 | 2/1986 | Mabuchi et al. . |
| 4,603,899 | 8/1986 | Iwasa . |
| 4,631,206 | 12/1986 | Mabuchi et al. . |
| 4,656,098 | 4/1987 | Yonekura et al. . |
| 4,676,856 | 6/1987 | Shigeki et al. . |
| 4,783,931 | 11/1988 | Kirkwood . |
| 5,123,988 | 6/1992 | Iwasa . |

OTHER PUBLICATIONS

English Abstract of Yamaguchi Japanese Application published Sep. 1983 as No. 58-158216.

*Primary Examiner*—Michael W. Ball
*Assistant Examiner*—Sam Chuan Yao
*Attorney, Agent, or Firm*—Cushman Darby & Cushman IP Group of Pillsbury Madison & Sutro LLP

[57] ABSTRACT

A rubber layered structure used for a weather strip or a glass run, which includes an EPDM rubber base and an ornamental surface layer or a functional surface layer for enhancing slidability of a door glass. An ornamental or functional surface layer is stuck to an EPDM rubber base with a laminated film. The laminated film includes a first layer of an olefin resin with polar functional groups and a second layer of a polar thermoplastic resin. The first layer, which includes a non-polar olefin resin and polar functional groups, adheres to both the EPDM rubber base and the second layer of a polar resin such as polyester. The second layer securely adheres to the surface layer.

7 Claims, 5 Drawing Sheets

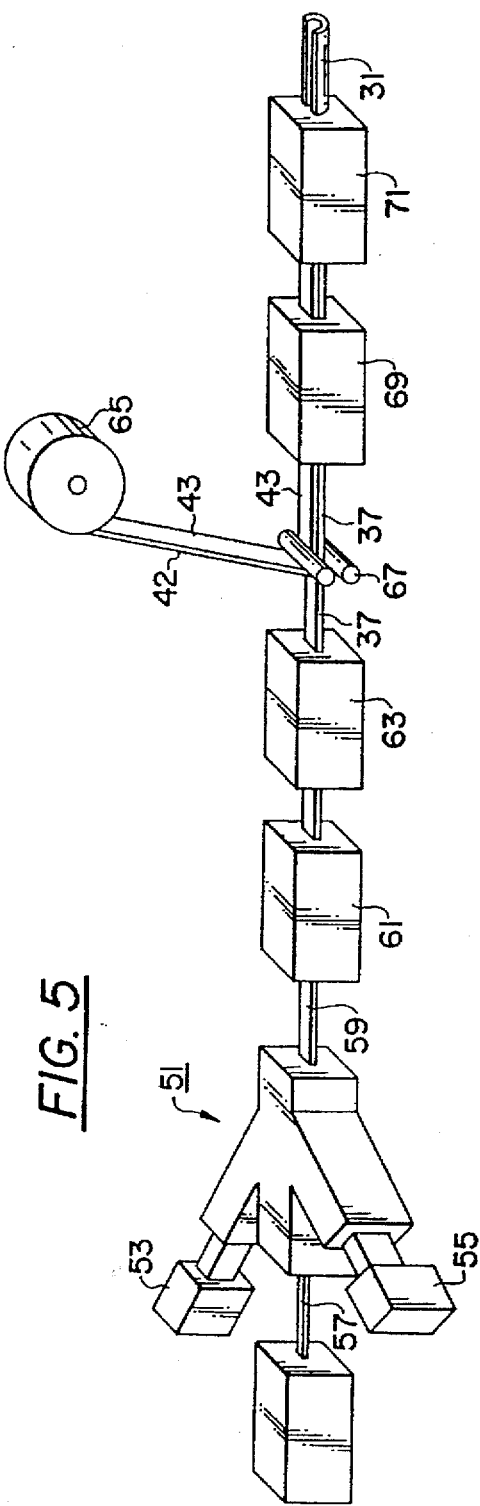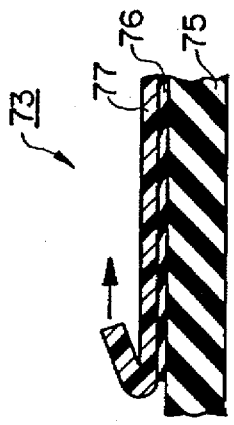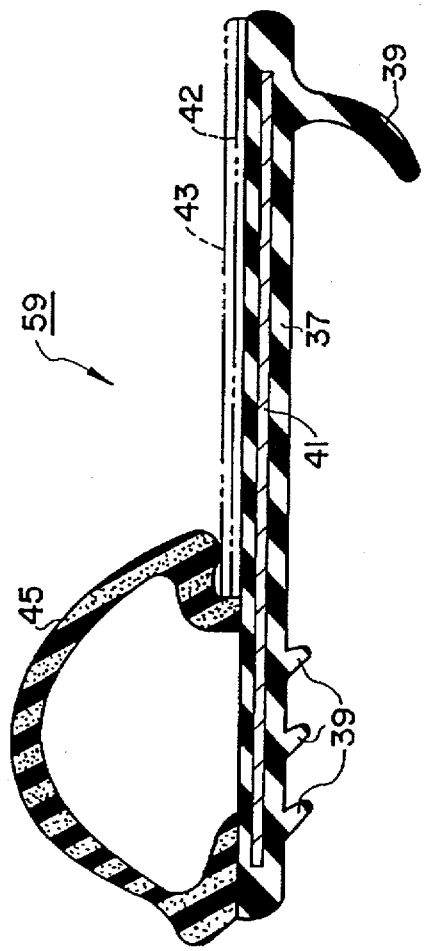

MANUFACTURING PROCESS OF RUBBER LAYERED STRUCTURE

This is a division of application Ser. No. 08/227,988, filed Apr. 15, 1994, now U.S. Pat. No. 5,489,461 which was a continuation of application Ser. No. 08/126,740, filed Sep. 27, 1993, abandoned; which was a continuation of application Ser. No. 07/793,730, filed Nov. 21, 1991, abandoned.

BACKGROUND OF THE INVENTION

1. Field of the Invention

The present invention relates to a rubber layered structure, and more particularly to a structure for attaching to the periphery of openings of an automobile. The rubber layered structure includes an EPDM rubber base and a surface layer such as an ornamental layer or a layer for enhancing the slidability of window glass.

2. Description of the Related Art

EPDM (ethylene-propylene non-conjugated diene copolymer) rubber is widely used for automobile parts which require good resistance to weather, ozone, and heat. A variety of elements including an EPDM rubber base has been studied to attain pleasing designs and enhance functions such as slidability.

EPDM rubber is favorably applied to, for example, weather strips. Weather strips are attached to the periphery of door openings of automobiles to seal the openings so as to keep out rainwater, dust and noise.

EPDM rubber itself is, however, black and not visually pleasing. Accordingly, the EPDM rubber base is usually covered with an ornamental layer such as polyester or nylon cloth which has a color well matched with the automobile interior.

The manufacturing process for the rubber layered structure having an EPDM rubber base and a surface layer includes, for example, extrusion and vulcanization of the EPDM rubber base, buffing and de-greasing of the EPDM rubber base, coating with a primer and an adhesive, drying of the adhesive, application of the surface layer, and solidification of the adhesive.

The conventional process requires a number of steps noted above which results in a long production line, thus causing low productivity and high cost.

JAPANESE LAID-OPEN PATENT PUBLICATION No. Sho-58-158216 proposes a method in which a solvent adhesive including ethylene vinyl alcohol (EVA), nylon, or polyester is first applied on the surface on one side of a surface member. The adhesive side of the surface member is placed upon an extruded main body immediately after extrusion forming and is further pressed thereon with a roller. The internal heat of the extruded main body melts the adhesive, and the surface member is accordingly stuck to the extruded main body. This method, however, has certain disadvantages when used with such materials as an EPDM rubber base because no adhesives can securely stick to both the EPDM rubber base and surface layer material such as polyester.

Besides being used for weather strips to seal door openings, EPDM-rubber is also used for a weather strip between a door sash and a window glass, which is generally called a glass run. A member for enhancing slidability of glass is stuck to a portion of the glass run facing the window glass, or alternatively, the portion is covered with a slidable material or flocking so as to enhance the slidability of the window glass. This rubber layered structure has the same problems as stated above for other weather strips, that is, low productivity and poor adhesive strength.

SUMMARY OF THE INVENTION

An object of the present invention is to form a rubber layered structure having good adhesive strength without the troublesome steps of buffing and applying an adhesive.

The present invention is directed to a rubber layered structure comprising: an EPDM rubber base; and a laminated film comprising a first layer of an olefin resin with polar functional groups disposed on the EPDM rubber base, and a second layer of a polar thermoplastic resin disposed on the first layer, wherein the first layer is stuck to the EPDM rubber base by melting and resolidifying of the first layer.

According to an aspect of the present invention, the second layer includes an ornamental surface layer.

According to another aspect of the present invention, the rubber layered structure further comprises an ornamental surface layer disposed on the laminated film, wherein the ornamental surface layer is stuck to the EPDM rubber base with the laminated film. Specifically, the ornamental surface layer adheres to the EPDM rubber base layer by melting and re-solidifying the laminated film.

According to a preferred embodiment, the rubber layered structure is a weather strip for sealing the periphery of an opening of an automobile body and the ornamental surface layer faces the interior of the automobile. According to another preferred embodiment, the rubber layered structure is a glass run for sealing and guiding a window glass of an automobile door, and the glass run further comprises a surface layer for reducing sliding resistance of the window glass. Specifically, the surface layer is stuck to the EPDM rubber base with the laminated film by melting and re-solidifying the laminated film.

Preferably, the second layer comprises polyester resin. The ornamental surface layer is polyester fabric. Furthermore, the surface of the surface layer can be flocked.

The present invention is further directed to a method of forming the rubber layered structure, comprising the steps of: (a) preparing a laminated film comprising a first layer of an olefin resin with polar functional groups disposed on the EPDM rubber base, and a second layer of a polar thermoplastic resin disposed on the first layer; (b) forming an EPDM rubber base by extrusion; (c) vulcanizing the EPDM rubber base; and (d) attaching the laminated film to the EPDM rubber base by melting and re-solidifying at least part of the laminated film. The heat for melting the laminated film is obtained from the heat in the EPDM rubber base remaining from the vulcanizing.

According to another embodiment of the present invention, at the attaching step (d), the laminated film is pressed by a roller onto the heated EPDM rubber base after the vulcanizing step, whereby the ornamental surface layer becomes stuck to the rubber base.

According to another embodiment of the present invention, the rubber layered structure is a glass run for sealing and guiding a window glass of the automobile door. The glass run further comprises a surface layer for reducing the sliding resistance of the window glass. Specifically, the surface layer is stuck to the EPDM rubber base with the laminated film by melting and re-solidifying of the laminated film at the attaching step (d).

According to another embodiment of the present invention, the surface layer is stuck to the laminated film during the preparing step (a), and at the attaching step (d) the surface layer with the laminated film is pressed by a roller onto the heated EPDM rubber base after the vulcanizing step, whereby the surface layer is stuck by the laminated film to the EPDM rubber base.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is an explanatory view illustrating a production line for manufacturing the weather strip;

FIG. 6 is a cross-sectional view showing a weather strip prepared by extrusion forming;

FIG. 7 is an explanatory view illustrating a peeling test of the weather strip;

DESCRIPTION OFT HE PREFERRED EMBODIMENTS (I) Rubber layered structure

Figure 1A:
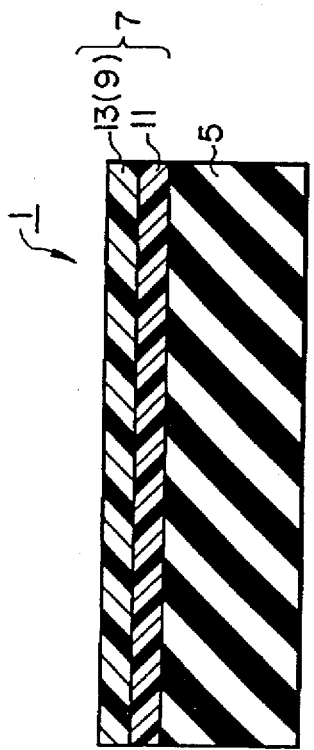
FIG. 1A is a cross sectional view showing a rubber layered structure embodying the invention.

FIG. 1A is a cross-sectional view of a rubber layered structure embodying the invention. A rubber layered structure 1 includes an EPDM rubber base 5 and a surface layer 9, which adheres to the EPDM rubber base 5 by a laminated film 7. The laminated film 7 includes a first film 11 on the EPDM rubber base 5 and a second film 13 on the first film 11.

EPDM rubber is ethylene- propylene non-conjugated diene copolymer. EPDM rubber can be produced in the following manner. A slight amount of non-conjugated diene such as ethylidene norbornene dicyclopentadiene, 1,4-hexadiene is added to ethylene and propylene. The mixture is then copolymerized to have double bonds in side chains for sulfur vulcanization. EPDM rubber can also include a reinforcing filler such as carbon black or white filler, a plasticizer, a sliding agent, and a vulcanizing agent.

The first film 11 is prepared by introducing polar functional groups into a non-polar olefin resin. The first film 11 hence has excellent adhesion to EPDM rubber by properties of the olefin resin and also attains sufficient adhesion to polyester or nylon resin by properties of the polar functional groups. Such polar functional groups can include carboxyl, hydroxyl, amino, halogen, and acrylic groups. Examples of commercially available materials for the first film 11 include those sold under the trademark of ADMER by Mitsui Petrochemical Industries, Ltd., BONDFARS by Sumitomo Chemical Co., Ltd., and MODIC by Mitsubishi Petrochemical Co., Ltd.

The second film 13 is made of a polar thermoplastic resin. The second film 13 hence has sufficient adhesion to the first film 11 as well as a non-metal member such as a polyester sheet or cloth, or a metal member such as a metal foil or vacuum-evaporated metal film. The second film 13 can be composed of nylon (N(PA)), polyethylene (PE), polypropylene (PP), polystyrene (PS), poly(vinyl alcohol) (PVA), poly(vinyl chloride) (PVC), poly(vinylidene chloride) (PVDC), ethylene-vinyl alcohol copolymer, or IONOMAER. Copolymerized polyester resins are preferably used for the second film 13 and an example of such resins is sold under the trademark of CHEMIT R-248 by Toray Industries, Inc. The surface layer 9 is composed of a non-metal material or metal such as an aluminum foil or a nickel chromium vacuum-evaporated film. Alternatively, the surface layer 9 is composed of a non-metal material having adhesion to the second film 13: for example, fabrics such as polyester, or resin sheets such as polyvinyl chloride (PVC), nylon, and urethane.

Figure 2:
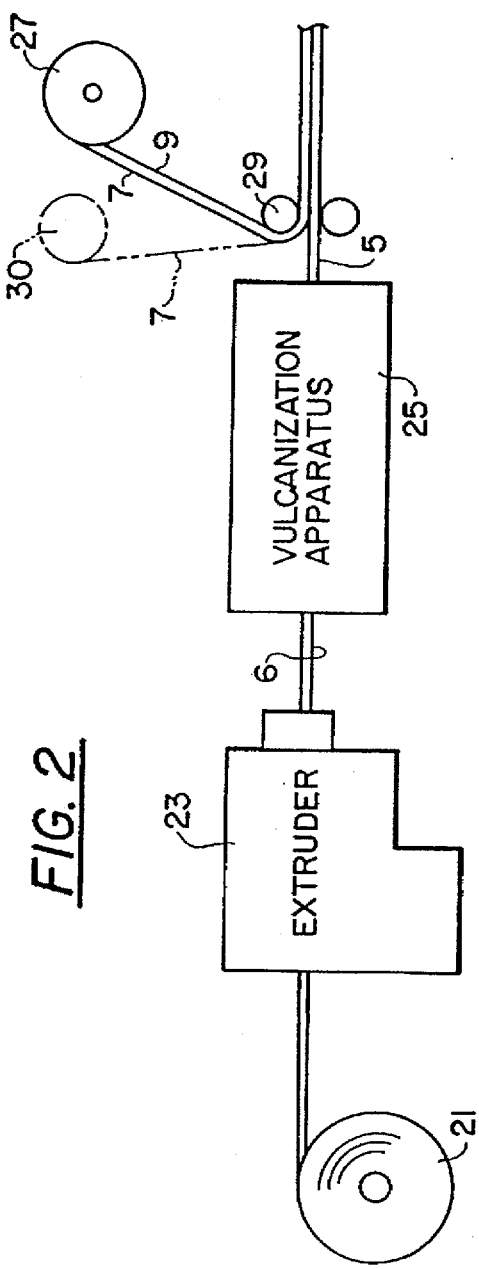
FIG. 2 is an explanatory view illustrating the production line for the manufacturing process of the rubber layered structure.

FIG. 2 schematically illustrates a production line for the rubber layered structure 1.

Before continuous processes on the production line, the laminated film 7 can be prepared by any known method, for example, extrusion lamination, dry lamination, wet lamination, hot-melt lamination, or double layer inflation. The extrusion lamination is, however, favorable. In such extrusion lamination, molten resin materials for the first film 11 and the second film 13 are simultaneously extruded from a T-shaped die mounted on the end of an extruder so as to form wide laminated film. The dry lamination is also a favorable method, wherein two films separately extruded are united with an adhesive in a subsequent step.

According to the continuous process shown in FIG. 2, first, an unvulcanized solid rubber material of EPDM 21 is extruded as an extruded body 6, which forms the EPDM rubber base 5, with an extruder 23.

The extrusion extruded body 6 is then passed through a vulcanization apparatus 25 at temperatures between 180 degrees C. and 240 degrees C. which are favorable for vulcanization of EPDM rubber.

The surface layer 9 with the laminated film 7 previously stuck hereto is wound around a roller 27. The band of the layer and the film 7 is successively fed out while being pressed onto the EPDM rubber base 5 with a pressure roller 29. Adhesion occurs immediately after vulcanization of the EPDM rubber base 5 to make use of the heat of the EPDM rubber base 5. Accordingly, the laminated film 7 is melted and re-solidified, so that the surface layer 9 is stuck to the EPDM rubber base 5.

Alternatively, the laminated film 7 and the surface layer 9 are wound about respective rollers 27 and 30 as shown in the twodot line of FIG. 2. The laminated film 7 and the surface layer 9 are simultaneously fed out, and the EPDM rubber base 5 and the surface layer 9 are then united by the laminated film 7.

After completion of the above processes, the layered band is cooled and either cut or bent to a desired shape so as to form the rubber layered structure 1.

In the above embodiment, the laminated film 7, which is used to make the surface layer 9 adhere to the EPDM rubber base 5, includes the first film 11 of a non-polar olefin resin with polar functional groups and the polar second film 13. The first film 11 adheres to the EPDM rubber base 5 because of its affinity with EPDM rubber which is olefin rubber, and the polar second film 13 securely adheres to the surface layer 9 because of its polarity. By this means, the surface layer 9 securely adheres to the EPDM rubber base 5.

The embodiment described above has the following advantageous effects. The embodiment causes the surface layer 9 to adhere to the EPDM rubber base 5 by making use of heat due to vulcanization on the continuous production line. Namely, the process in the embodiment eliminates the need for a heating process to melt the laminated films 7, thereby improving productivity. The process makes use of thermal energy left in the EPDM rubber base 5 due to the vulcanization, thus saving energy. Furthermore, the embodiment does not require labor-consuming and time-consuming processes such as buffing and application of an adhesive, thus attaining a shorter production line and simplified equipment. The embodiment utilizes fusion of the EPDM rubber base and the surface layer by the laminated film 7, and thus does not require any adhesive, further reducing the cost.

Figure 1B:
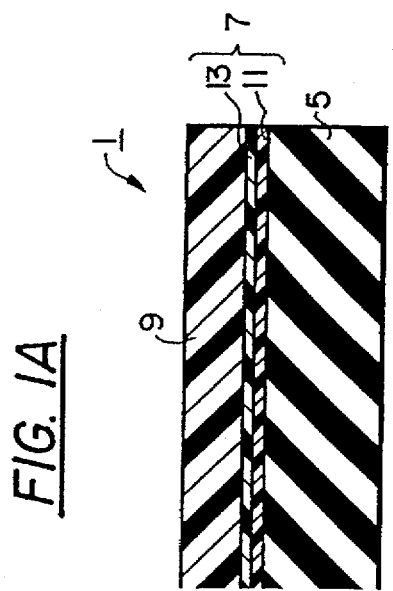
FIG. 1B is a cross sectional view showing a modification of the rubber layered structure.

Although the rubber layered structure 1 in this embodiment includes the surface layer 9 as an ornamental layer, in another embodiment, the layer 9 can be omitted and the second film 13 can be used as the surface layer such as in FIG. 1B.

II) Weather strip

Figure 3:
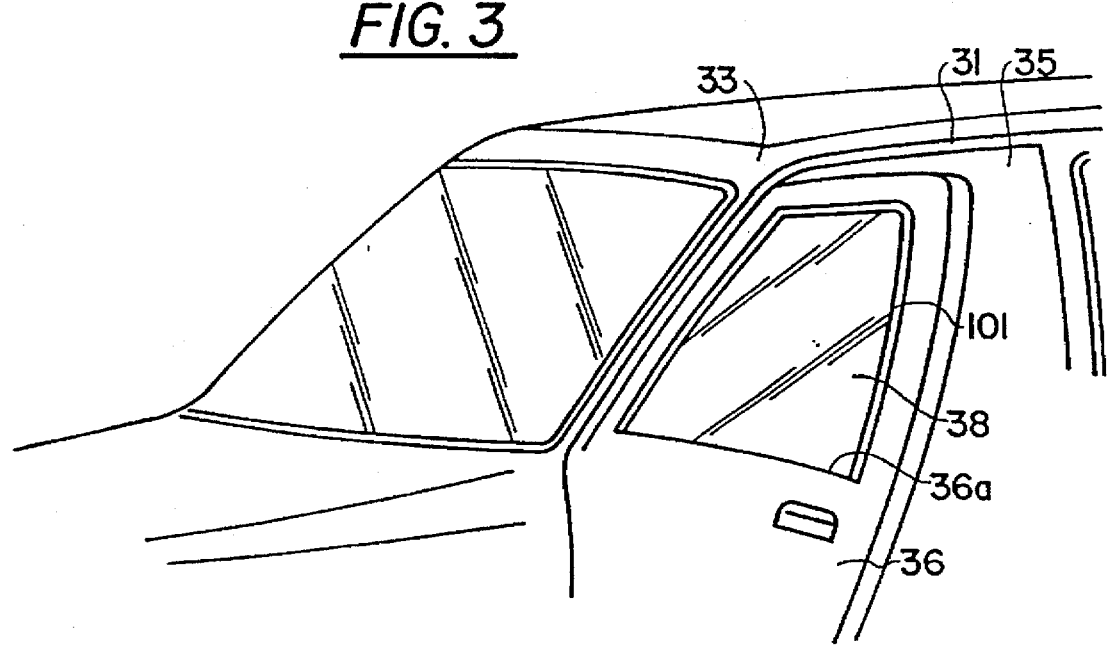
FIG. 3 is an explanatory view illustrating an automobile exterior.

FIG. 3 is an explanatory view illustrating an automobile exterior where a weather strip door opening trim (hereinafter referred to as weather strip) embodying the present invention is used. A weather strip 31 is attached to the periphery of a door opening 35 of an automobile body 33.

Figure 4:
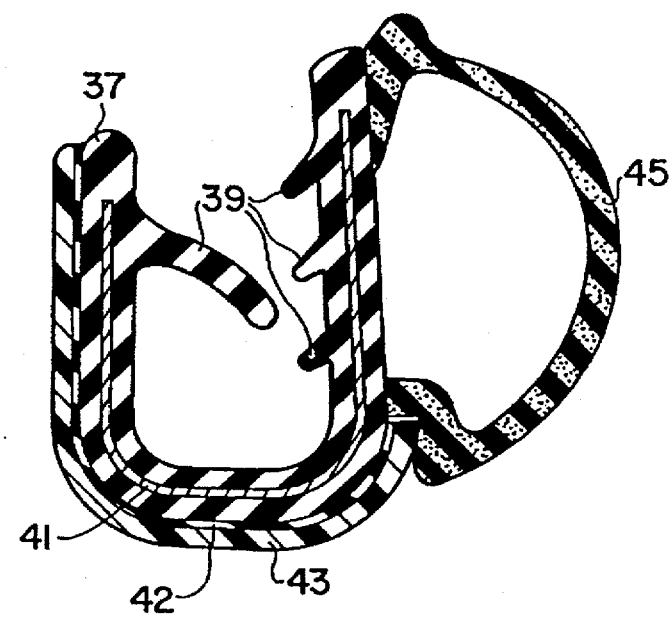
FIG. 4 is a cross-sectional view showing a weather strip embodying the invention.

FIG. 4 is a cross-sectional view of the weather strip 31. A U-shaped solid EPDM rubber base 37 is pressed and held to a flange (not shown) of the door opening 35 by a lip 39 of the EPDM rubber base 37. An insertion plate 41 is embedded in the EPDM rubber base 37.

An ornamental layer 43 adheres to the surface of the EPDM rubber base 37 by means of a laminated film 42. The ornamental layer 43 faces the interior of the automobile. A hollow sealing member 45 made of EPDM sponge rubber is integrally formed on the side of the EPDM rubber base 37.

FIG. 5 illustrates a production line used in manufacturing the weather strip 31.

First, an extruded body 59 shown in FIG. 6 was formed by extrusion with a cross-head extruder 51. Unvulcanized solid rubber material of EPDM supplied from a cylinder 53, unvulcanized sponge rubber material of EPDM supplied from another cylinder 55, and a core plate 57 forming the insertion plate 41 are simultaneously extruded at a speed of 5 m/min.

The composition of EPDM rubber used in this embodiment is, as follows:

| Constituents | Amounts (parts by weight) |
| --- | --- |
| EPDM | 100. |
| MAF carbon black | 130. |
| Paraffin process oil | 100. |
| Zinc white | 5. |

-continued

| Constituents | Amounts (parts by weight) |
| --- | --- |
| Stearic acid | 1. |
| Dehydrating agent (CaO) | 5. |
| Vulcanization accelerator | 3.5 |
| Sulfur | 2. |

EPDM rubber used here is sold under the trademark of JSREP 57C by Japan Synthetic Rubber Co., Ltd.

EPDM sponge rubber material includes EPDM rubber and a foaming agent. The core plate 57 is an iron plate.

The extruded body 59 was then vulcanized at a temperature of 200 degrees C. for five minutes. Specifically, the extruded body 59 was passed through a microwave (ultra high frequency: UHF) heater 61 for heating and a hot blast vulcanizing unit (HAV) 63 for maintaining the temperature.

In the subsequent adhesion process, the ornamental layer 43 with the laminated film 42 previously attached thereto was fed out of a roller 65, and pressed onto the EPDM rubber base 37 with a pressure roller 67 by making use of the remaining heat left over from vulcanization. Accordingly, the ornamental layer 43 adheres to the extruded body 59.

In this embodiment, the laminated film 42 includes: a first layer of 50 micrometer thick, consisting of olefin resin sold under the trademark of ADMER by Mitsui Petrochemical Industries, Ltd.; and a second layer which is 30 micrometer thick, consisting of a copolymerized polyester resin sold under the trademark of CHEMIT R-248 by Toray Industries, Inc.

The ornamental layer 43 is mainly composed of polyester fabric.

The layered structure including the ornamental layer 43 and the extruded body 59 was cooled by a cooler 69 and bent to a U-shape by a bender apparatus 71 to form the weather strip 31 shown in FIG. 4.

The weather strip 31 thus manufactured was kept at room temperature for twenty-four hours and then tested for peeling.

A 5 mm-wide test piece 73 including a surface layer 77 adhering to a laminated film 76 was cut out from the weather strip 31 as shown in FIG. 7. The free end of the surface layer 77 was pulled against the EPDM rubber base 75 in a direction shown by the arrow at a speed of 100 mm/min. As a result, the EPDM rubber base 75 broke at the load of 2.5 kg/5 mm, but the adhesion between the surface layer 77 and the EPDM rubber base 75 was maintained.

(III) Glass run

FIG. 3 also shows an example of glass runs. A glass run 101 is fixed to the periphery of a window opening of the door 36 of the automobile body 33.

Figure 8:
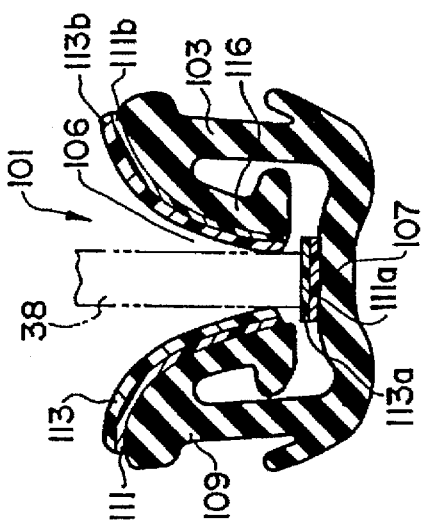
FIG. 8 is a cross-sectional view showing a glass run according to another embodiment of the invention.

FIG. 8 is a cross-sectional view of the glass run 101. A U-shaped solid EPDM rubber base 103 is attached to a framework (not shown) of the door 36. The EPDM rubber base 103 has a groove 106 into which a window glass 38 can be inserted. The groove 106 is defined by the inner bottom portion 107 of the EPDM rubber base 103 and L-shaped inner lip portions 116 of the EPDM rubber base 103.

Smooth sliding layers 113a and 113b for enhancing slidability of the window glass adhere to the bottom portion 107 and the inner lip portions 116 by means of laminated films 111a and 111b, respectively.

Figure 9:
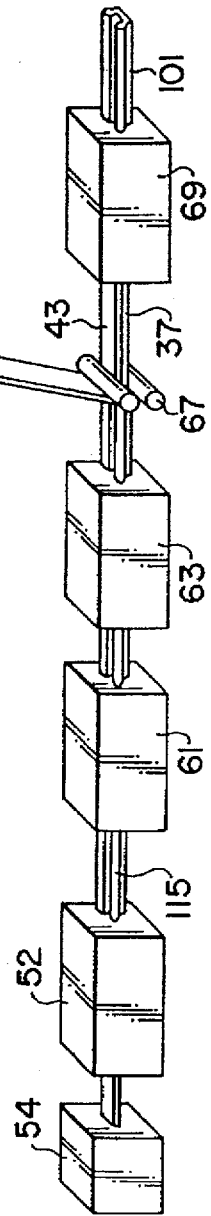
FIG. 9 is an explanatory view illustrating a production line for manufacturing the glass run.

FIG. 9 illustrates a production line used in manufacturing the glass run 101.

Figure 10:
FIG. 10 is a cross-sectional view showing the glass run produced by extrusion forming.

An extruded body 115 shown in FIG. 10 was formed by the extrusion of an unvulcanized EPDM solid rubber material by an extruder 52 from a cylinder 54.

The extruded body 115 was vulcanized by passing through the microwave heater 61 and the hot blast heater 63. The layers 113a and 113b were then stuck to the EPDM rubber base 103 by the laminated film 111a and 111b by making use of the remaining heat from vulcanization. The layered structure including the extruded body 115 and the surface layers 113a and 113b were cooled by the cooler 69 to form the glass run 101 of FIG. 8.

The glass run 101 thus constructed was kept at room temperature for twenty-four hours, and the following tests were carried out.

(1) Adhesion test (180 degree-peeling)

Part of the glass run 101 was cut off as a test piece in the same manner as the weather strip 31 described above, and similar results were obtained. Namely, the EPDM rubber base 103 broke at the load of 2.5 kgf/5 mm while the adhesion between the surface layer 113a or 113b and the EPDM rubber base 103 was maintained.

(2) Slidability test

Figure 11:
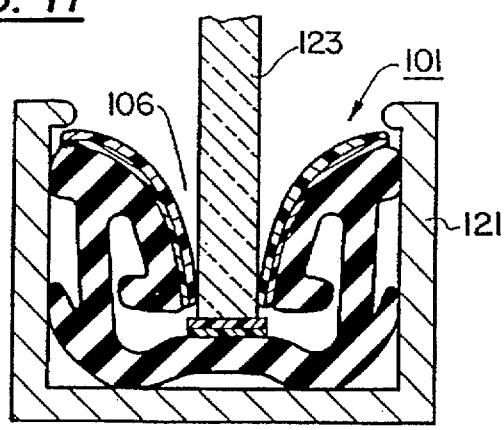
FIG. 11 is a cross-sectional view showing a slidability test of the glass run.
Figure 12:
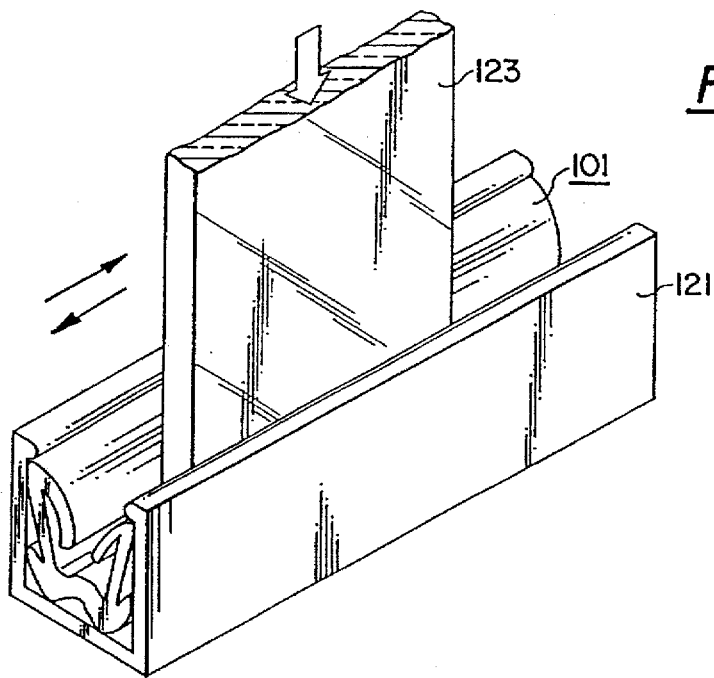
FIG. 12 is a perspective view illustrating the slidability test of the glass run.

As shown in FIGS. 11 and 12, the glass run 101 was attached to a framework 121. A glass plate 123 was slid at a speed of 100 mm/min in the groove 106 while pressed downward at a load of 1 kgf. The sliding resistance was 0.2 kgf/50 mm, which is no more than is obtained with conventional flocking.

(3) Abrasion test

The glass 123 was slid in a direction shown by the arrow at a stroke of 100 mm for an abrasion test under the same conditions as the slidability test. Peeling of the surface layer 113a or 113b was not observed even after ten thousand cycles of sliding, neither were there any fallen flock observed.

Figure 13:
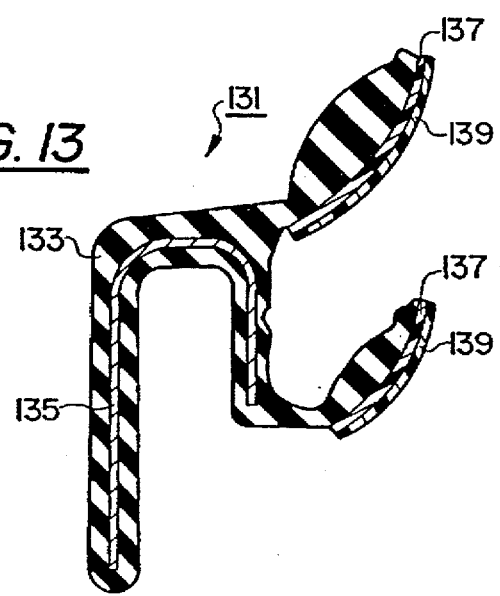
FIG. 13 is a cross-sectional view showing a glass inner member in a window sealing assembly according to a further embodiment of the invention.

The present invention is applicable to a glass inner member attached to a lower window frame 36a of the door 36 for enhancing slidability of the window glass 38, and an opposing glass outer member. A glass inner member 131 shown in FIG. 13 includes: an EPDM rubber base 133 in which an iron insertion plate 135 is embedded, and surface layers 139 for enhancing slidability of the window glass 38. The surface layers 139 adhere to respective projecting portions of the EPDM rubber base 133 via a laminated film 137.

The present invention is also applicable to various glass runs including a double-channel type as well as the single-channel type shown in FIG. 8.

In place of the polyester fabric in the above embodiment, the surface layer of the glass run can have a flocked member surface layer with short fiber or can be processed in any way effective for reducing sliding resistance in place of the polyester fabric in the above embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of forming a rubber layered structure having a EPDM rubber base layer and a laminated film layer, comprising the steps of:

(a) preparing a laminated film comprising a first film layer of a non-polar olefin resin modified by the introduction of maleic arthydride to form a modified olefin resin, said modified olefin resin being directly bondable to the EPDM rubber base layer, and a second film layer of a polar thermoplastic resin directly attached to said modified olefin resin first film layer;

(b) extrusion-forming said EPDM rubber base layer;

(c) vulcanizing said EPDM rubber base layer; and (d) attaching and roller pressing said non-polar olefin first film layer onto said EPDM rubber base layer by melting and re-solidifying at least surface of said non-polar olefin first film layer with heat from said EPDM rubber base layer remaining from said vulcanizing step.

2. A method according to claim 1, wherein said rubber layered structure is a weather strip for sealing an opening of an automobile body, and said laminated film further comprises an ornamental surface layer.

3. A method according to claim 2, wherein said second film of said polar thermoplastic resin layer is made of a polyester resin, and said ornamental surface layer is made of a polyester fabric.

4. A method as in claim 1, wherein said rubber layered structure is a glass run for sealing and guiding a window glass of an automobile, the method of forming a rubber layered structure includes the further step of attaching a surface layer onto said second film layer with the surface layer comprising a surface for reducing sliding resistance of the window glass.

5. A method according to claim 4, wherein said second film layer of said polar thermoplastic resin is made of a polyester resin, and the surface layer is made of a polyester fabric.

6. A method according to claim 4, wherein the surface layer is attached onto said polar thermoplastic resin layer of the laminated film layer during said preparing step, and wherein at said attaching and roller pressing step said modified olefin first film layer is roller pressed onto at least the portion of the EPDM rubber base that is to contact the window glass.

7. A method as in claim 1 wherein the vulcanizing step heats the EPDM rubber base layer to a temperature between about 180° C. to 240° C. and the step of attaching and roller pressing occurs immediately following vulcanizing.

* * * * *